US010664997B1

(12) United States Patent
Fegyver et al.

(10) Patent No.: US 10,664,997 B1
(45) Date of Patent: May 26, 2020

(54) METHOD, CAMERA SYSTEM, COMPUTER PROGRAM PRODUCT AND COMPUTER-READABLE MEDIUM FOR CAMERA MISALIGNMENT DETECTION

(71) Applicant: AImotive Kft., Budapest (HU)

(72) Inventors: Zoltán Fegyver, Budapest (HU); László Babay, Budapest (HU)

(73) Assignee: AImotive Kft., Budapest (HU)

( * ) Notice: Subject to any disclaimer, the term of this patent is extended or adjusted under 35 U.S.C. 154(b) by 0 days.

(21) Appl. No.: 16/208,997

(22) Filed: Dec. 4, 2018

(51) Int. Cl.
  *G06T 7/73* (2017.01)
  *G06T 7/80* (2017.01)
  *G06T 7/13* (2017.01)
  *G08B 21/18* (2006.01)

(52) U.S. Cl.
  CPC .................. *G06T 7/80* (2017.01); *G06T 7/13* (2017.01); *G06T 7/74* (2017.01); *G08B 21/182* (2013.01); *G06T 2207/20024* (2013.01); *G06T 2207/30244* (2013.01); *G06T 2207/30252* (2013.01)

(58) Field of Classification Search
  None
  See application file for complete search history.

(56) References Cited

U.S. PATENT DOCUMENTS 5,317,644 A * 5/1994 Kenyon ............. G06K 9/00127
                                              359/370
7,877,175 B2   1/2011 Higgins-Luthman
(Continued)

FOREIGN PATENT DOCUMENTS

| EP | 2293247 A1 | 3/2011 |
| WO | 2011085489 A1 | 7/2011 |
| WO | 2013086249 A2 | 6/2013 |

OTHER PUBLICATIONS

Raghavan et al.; "Detection of Scene Obstructions and Persitent View Changes In Transportation Camera Systems" dated Sep. 2012; 15th International IEEE Conference on Intelligent Transportation Systems; 6 pages.
(Continued)

*Primary Examiner* — Shadan E Haghani
(74) *Attorney, Agent, or Firm* — Wood Herron & Evans LLP

(57) ABSTRACT

The invention is a method for camera misalignment detection by means of processing images of a camera fixed to a vehicle and having a field of view containing a vehicle image area (11) imaging a portion of the vehicle and a remaining area (12), wherein in said processing step a plurality of reference locations (21) within an input image are used, said reference locations (21) being determined as edge locations along a boundary of the vehicle image area (11) in a reference image, and said processing step comprises checking at the reference locations (21) within the input image whether said reference locations (21) are edge locations by ascertaining at each reference location (21) whether a magnitude of an image gradient is above a gradient threshold limit, and alerting misalignment depending on an ascertained subset of the reference locations (21) where the gradient threshold limit is not reached. The invention also relates to a camera system, a computer program product and a computer-readable medium embodying the method.

19 Claims, 4 Drawing Sheets

(56) References Cited

U.S. PATENT DOCUMENTS

| | | | |
|---|---|---|---|
| 8,001,860 B1* | 8/2011 | Preston | B60W 40/11 |
| | | | 73/866.5 |
| 8,054,881 B2* | 11/2011 | Mohanty | H04N 5/23248 |
| | | | 375/240.09 |
| 9,296,337 B2 | 3/2016 | Vico et al. | |
| 10,122,969 B1* | 11/2018 | Lim | H04N 7/147 |
| 10,204,445 B2* | 2/2019 | Kotake | G06T 7/73 |
| 2009/0003720 A1* | 1/2009 | Sun | H04N 1/41 |
| | | | 382/254 |
| 2012/0170808 A1* | 7/2012 | Ogata | B60R 21/0134 |
| | | | 382/103 |
| 2013/0335579 A1 | 12/2013 | Raghavan et al. | |
| 2014/0369557 A1* | 12/2014 | Kayombya | G06K 9/00624 |
| | | | 382/103 |
| 2015/0030206 A1* | 1/2015 | Jin | G06K 9/64 |
| | | | 382/103 |
| 2015/0262336 A1* | 9/2015 | Jin | G06T 3/4053 |
| | | | 382/275 |
| 2015/0302592 A1* | 10/2015 | Bruls | G06T 7/13 |
| | | | 348/44 |
| 2017/0177970 A1* | 6/2017 | Kitajima | G06K 9/4604 |
| 2018/0089832 A1* | 3/2018 | Liu | G06K 9/4642 |
| 2018/0374203 A1* | 12/2018 | Xiao | G06T 5/40 |

OTHER PUBLICATIONS

European Patent Office; Search Report and Written Opinion in related International Patent Application No. PCT/HU2019/000040 dated Mar. 11, 2020; 13 pages.

* cited by examiner

METHOD, CAMERA SYSTEM, COMPUTER PROGRAM PRODUCT AND COMPUTER-READABLE MEDIUM FOR CAMERA MISALIGNMENT DETECTION

TECHNICAL FIELD

The invention relates to a method, a camera system, a computer program product and a computer-readable medium for camera misalignment detection by means of processing images of a camera fixed to a vehicle.

BACKGROUND ART

A number of cameras are usually mounted on/in a car or vehicle, which cameras are pre-calibrated, i.e. their position and orientation are exactly calculated and stored. The understanding of real-world data seen through the cameras heavily depends on these calibration values. As the car travels, due to shocks the cameras may become misaligned, so a recalibration may be required. So, camera sensors mounted on vehicles, such as self-driving cars, can be misaligned during driving.

On-line calibration or recalibration methods can correct misalignments but these methods are time-consuming, computationally heavy operations, so it is desired to run them only when camera misalignment is detected. Therefore, there is a need for an efficient camera misalignment detection, and there is also a need for a fast and simple method by which a misalignment alert can be produced.

Existing misalignment detection methods often comprise detecting external objects, like that disclosed in US 2013/0335579 A1, and/or additional markers placed on the car, wherein their detected displacement indicates misalignment of the camera. Such additional means/steps/conditions increase the complexity of prior art systems making those also more error-prone, and also require lots of computing power for feature detection.

U.S. Pat. No. 7,877,175 B2 discloses an imaging system for a vehicle, which system includes an imaging array sensor and a control. This known system processes zones or areas of interest in the captured images and adjusts processing to accommodate any misalignment of the camera that may occur during installation of the camera at the side of the vehicle. According to this document, in order to verify that the camera or imaging sensor is mounted at the vehicle (such as at an exterior portion of the vehicle) within a desired tolerance limit so as to provide the desired field of view, the camera may detect the side of the vehicle and/or the door handle or handles of the vehicle and the control may confirm that they are in the expected location in the captured images. If the control determines that the camera is not aligned or aimed at the desired location, the control may adjust the image and/or image processing to account for any such misalignment of the camera. For example, the degree of misalignment may be calculated, and the image processing may be adjusted or shifted and/or rotated to position the reference structure at the appropriate location in the captured images. This known solution does not provide a simple, robust and reliable method for generating misalignment alert, as it necessitates the implementation of complex object-detecting algorithms.

U.S. Pat. No. 9,296,337 B2 discloses a method of calibrating a vehicular camera. This solution uses a visible part of the car, the bumper, and uses only one reference point and a complex image processing algorithm for detecting misalignment. The detection of the reference point is based on an iterative search algorithm which is based on pixel intensities. This system is mainly designed for rear view cameras, and necessitates a complex image processing method, which is undesirable, and it has several special prerequisites preventing robustness. E.g. the known system takes advantage of the horizontal alignment of the car bumper; therefore it does not provide a general solution applicable to various parts of the exterior of the car. Furthermore, detecting only one point does not result in a reliable system, as e.g. dirt can appear at relevant places on both the camera and the bumper during driving, which can deteriorate or make impossible successful detection.

DESCRIPTION OF THE INVENTION

Thus, an object of the invention is to provide a method, a camera system, a computer program product and a computer-readable medium for camera misalignment detection which are as free of the disadvantages of the prior art solutions as possible. It is a further object of the invention to provide a simple, robust and reliable method for misalignment detection and for generating misalignment alert, if misalignment is detected.

The objects of the invention are achieved by the method according to claim 1, by the camera system according to claim 18, by the computer program product according to claim 19 and by the computer-readable medium according to claim 20.

The proposed solution provides a much more flexible and faster approach than prior art solutions. An a-priori knowledge is used, namely the locations of the edges appearing in the camera image due to the vehicle exteriors/boundary. In this way we know exactly the directions and positions of edges that are expected in a general input image.

In an input image the edges in a $\delta$ distance of the expected locations can be measured and their directions can be checked as well. If the proper amount of edges is present and they match, the camera is not misaligned. This method works for edges of all directions, and several check-points can be defined resulting in a more robust detection. The edge detection and direction matching is a simpler and faster method than the one described in U.S. Pat. No. 9,296,337 B2 and especially not as complicated as the feature detectors used in US 2013/0335579 A1. There is no need to check what (object) causes the edge, neither is locating the new positions of the edges required, and there is no need for calculating any $\delta$-location either. The simplicity of this method is that no reference points or special objects are to be found during detection, and it is only to be checked whether proper edges are present in the pre-determined locations.

The complexity of the edge detection and direction matching in U.S. Pat. No. 9,296,337 B2 does not enable a method where a plurality of locations are checked during driving. It has been recognized, however, that by creating a simpler checking step, a plurality of locations can be checked continuously or regularly, making misalignment detection more reliable while requiring only a very limited portion of system resources.

The proposed solution checks the gradient magnitudes in the desired positions and signals a warning if less than a limit number of locations fulfil the edge-criteria. So, we do not have to check whether the detected edge belongs to the car or to any object, neither do we check where the edge of the car is. Our condition is whether edges in a desired number of locations are present.

The invention uses the fact that cameras assembled into a vehicle, i.e. a self-driving car also view a part of the body of the car. When a camera is calibrated in the factory, among the alignment information, preferably a mask can also be created which identifies the part of the camera image belonging to the car and the part covering the remaining area. Using this mask, the edges of the car body can be extracted.

When using this system during driving, it is checked whether edges are present where they should be according to the reference data. If there is a mismatch, i.e. edges are not present where they should be, a camera misalignment warning signal is issued and an appropriate online calibration method can be run.

The proposed method overcomes the limitations of prior art solutions. It does not require any additional components other than the camera and the car. It does not require any complex image processing algorithm. The method is flexible enough to work in any situation when the car body is visible by the camera. It does not depend on any prerequisites, for example the horizontalness of the car bumper.

BRIEF DESCRIPTION OF THE DRAWINGS

The invention will hereinafter be described by way of preferred exemplary embodiments with reference to the drawings, where.

MODES FOR CARRYING OUT THE INVENTION

The invention is based on systems comprising a vehicle, preferably an autonomous car, having one or more cameras mounted on it. For the sake of simplicity, preferred embodiments below will be described mainly with respect to cars.

The proposed method is based on the fact that the car body and the background will always be separated by a boundary, i.e. an edge. The field of view of a camera also contains this information of the edge between the car body and the background. The main steps of the proposed method are the following:

During driving the car, input images are taken, then edge information/gradients are calculated at predetermined locations where edge-like gradients should be present;

it is checked whether strong enough edges, i.e. gradients are present where they should be; this means at the boundary (borders) on a reference image:

if strong enough edges are present in the locations where they should be, the camera is considered as aligned;

otherwise a signal is issued asking for recalibration.

Edge detection can be implemented as an extremely fast and lightweight operation. In addition, as we a-priori know from the reference image where the edges—corresponding to the car body boundary—shall be present, we can just calculate the edge information in those positions, and check whether they are present. In the aligned case, enough edges will be present in the desired positions, but not enough edge magnitudes will be found otherwise. As it can be seen, this method requires simple operations; there is no need for feature detection or similar, computationally heavy operations.

Thus, the invention is a method for camera misalignment detection by means of processing images of a camera fixed to a vehicle. Exemplary steps of determining the reference locations are depicted in FIGS. 1 to 4.

Figure 1:
FIG. 1 is an exemplary reference image.

As a first step of FIG. 1, a reference image 10 is taken by the camera. The camera has a field of view that contains a vehicle image area 11 imaging a portion of the vehicle and a remaining area 12, imaging essentially the surroundings of the vehicle.

Figure 2:
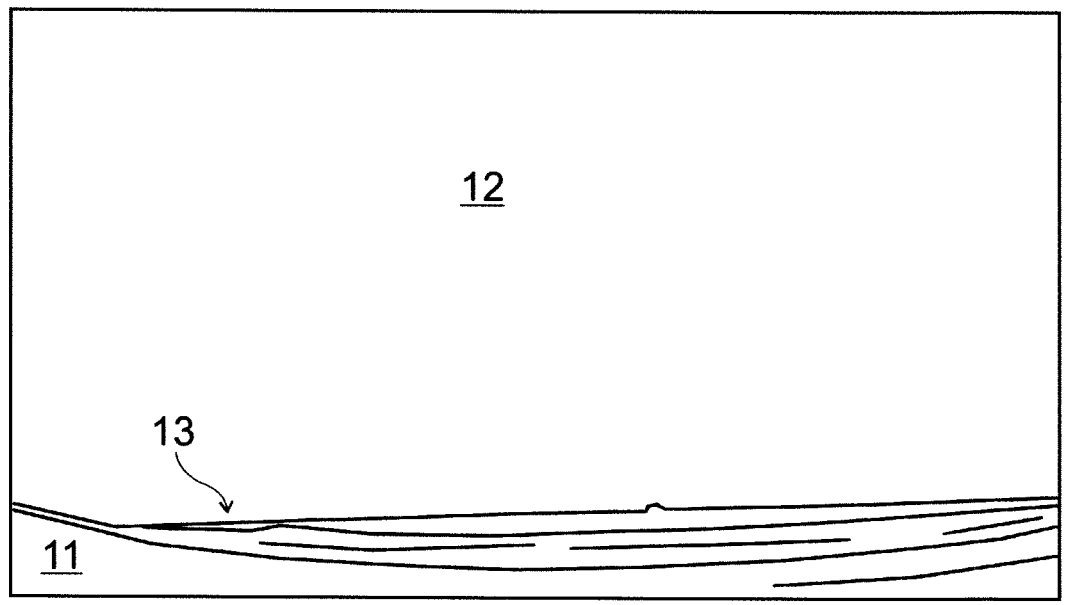
FIG. 2 is a result of an edge detecting image processing carried out in the image of FIG. 1.
Figure 3:
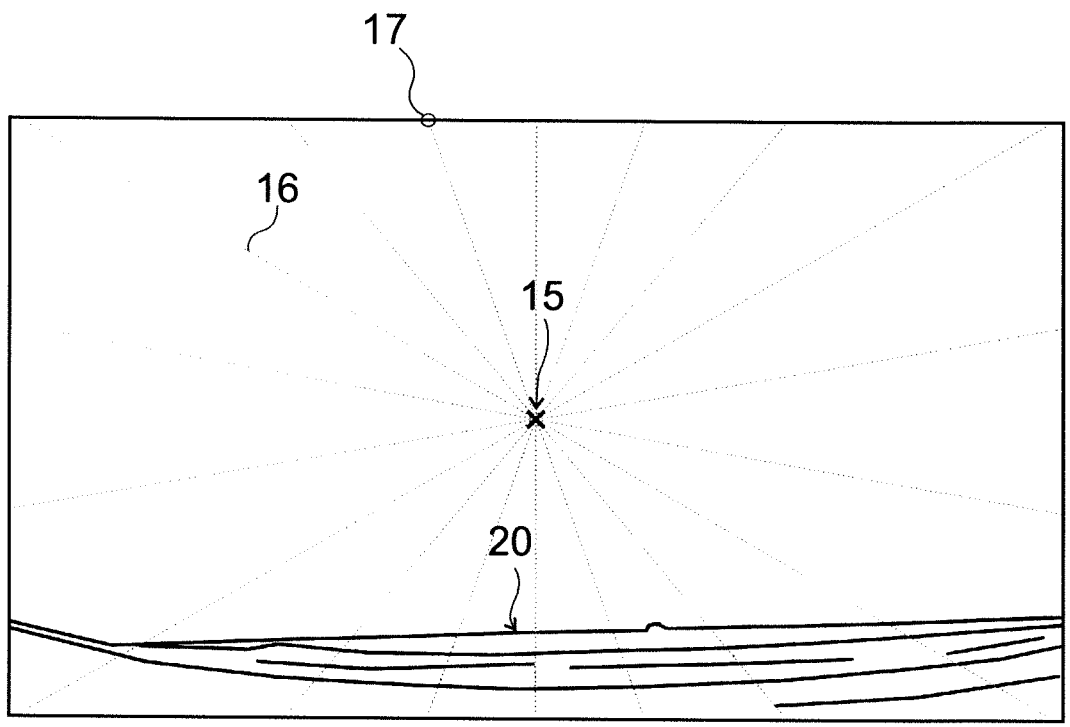
FIG. 3 shows exemplary line sections used for identifying reference locations in the image of FIG. 2.
Figure 4:
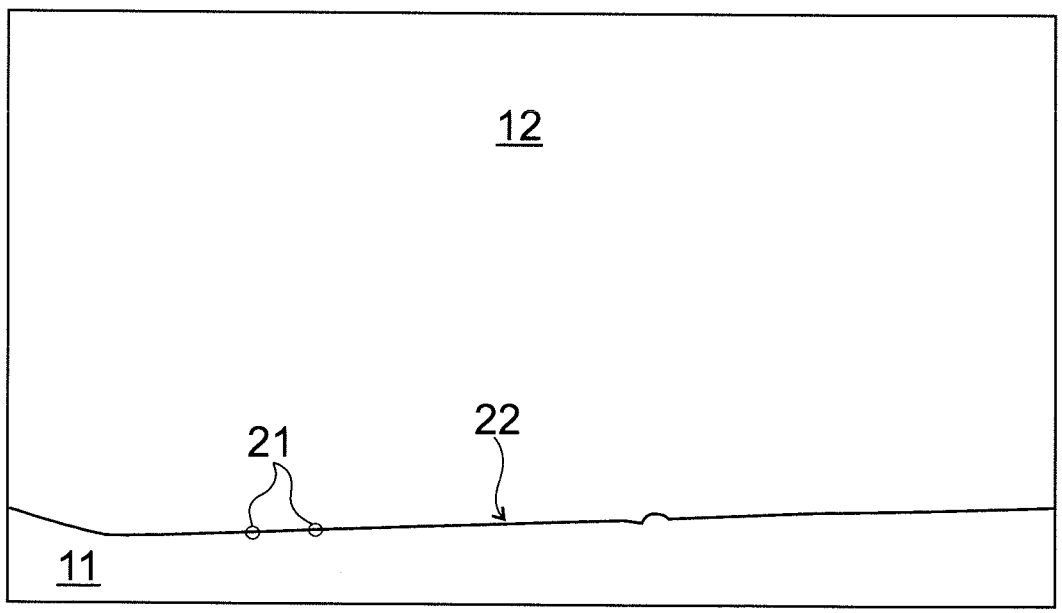
FIG. 4. shows a line of reference locations identified in FIG. 3.

Edge detection is thereafter applied in the reference image 10, extracting edges 13 of the vehicle, as depicted in FIG. 2. Any known edge detection method can be used for this purpose; a large number of manual, semi-automated or automated algorithms are known from the prior art, e.g. those applying neural network image processing.

It has been found that keeping only the extreme, i.e. boundary edge is advantageous, as further edges of the car body are usually less exact and are subject to reflections and displacements. Furthermore, too many reference locations 21 make the method less practicable. Therefore, in a preferred step of FIGS. 3 and 4, the extreme edge, being the boundary 20 of the car body is localized and only used for defining the reference locations 21. All pixels of the boundary 20 may constitute reference locations 21, but a subset of those pixels may also be used. To this end, it has been found that the vehicle image area 11 is always at the periphery of the image, so an advantageously simple way to determine the reference locations 21 in the reference image 10 is to find, along line sections 16 starting from a middle 15 of the reference image 10 outwards, first edge pixels of the vehicle image area 11. By locating these pixels, a reference location line 22 is located: it is composed by potential reference locations 21, all or some of which can be used further on for checking camera misalignment.

Preferably, a respective line section 16 interconnects each peripheral pixel 17 of the reference image 10 with the middle 15 of the reference image 10, to find all pixels of any reference location lines 22. Alternatively, neighboring line sections 16 can be equally angled to each other to find essentially equally spaced reference locations 21 throughout the reference image 10. Further ways to use the line sections 16 are also conceivable, e.g. to find a first edge pixel of the vehicle image area 11 and then using its neighboring pixels to define further line sections 16.

A-priori information can preferably be used for carrying out the finding process only along line sections 16 which may cross the boundary 20 of the vehicle image area. Even more preferably, only a boundary 20 part corresponding to unmovable parts of the vehicle body is used for determining reference locations 21.

Thus, in the inventive processing step a plurality of reference locations 21 within an input image of the camera are used, which reference locations 21 are determined as edge locations along the boundary 20 of the vehicle image area 11 in the reference image 10. The processing step comprises checking at the reference locations 21 within the input image whether said reference locations 21 are edge locations by ascertaining at each reference location 21 whether a magnitude of an image gradient is above a predetermined gradient threshold limit. The gradient threshold limit can be set uniformly for all of the reference locations 21 in an empiric way or it can be selected on the basis of a lowest gradient magnitude among gradient magnitudes at the reference locations 21 in the reference image 10. The gradient threshold limit can correspond to this lowest gradient magnitude or can be selected as a certain percentage of this value. A skilled person is capable to appropriately set this limit on the basis of the circumstances of the given application.

Image gradient is a generally known term and its technical meaning is thoroughly discussed in the prior art. An image gradient is a directional change in the intensity or color in an image. Mathematically, the gradient at each image point is a 2D vector with the components given by the derivatives in the horizontal and vertical directions. At each image point, the gradient vector points in the direction of the largest possible intensity change, and the length of the gradient vector corresponds to the rate of change in that direction.

Image gradient vectors are generally calculated on the basis of direct neighboring pixels, but it has been recognized during our experiments that calculating gradients on the basis of $2^{nd}$ neighbors or by a set of neighboring pixel values may provide less noise-sensitive and more accurate results in terms of both direction and magnitude.

As a last step of misalignment detection, misalignment is alerted depending on an ascertained subset of the reference locations 21 where the gradient threshold limit is not reached. In this context, the term subset may cover a fraction of the reference locations 21, or a particular group of reference locations 21, or both.

Figure 5:
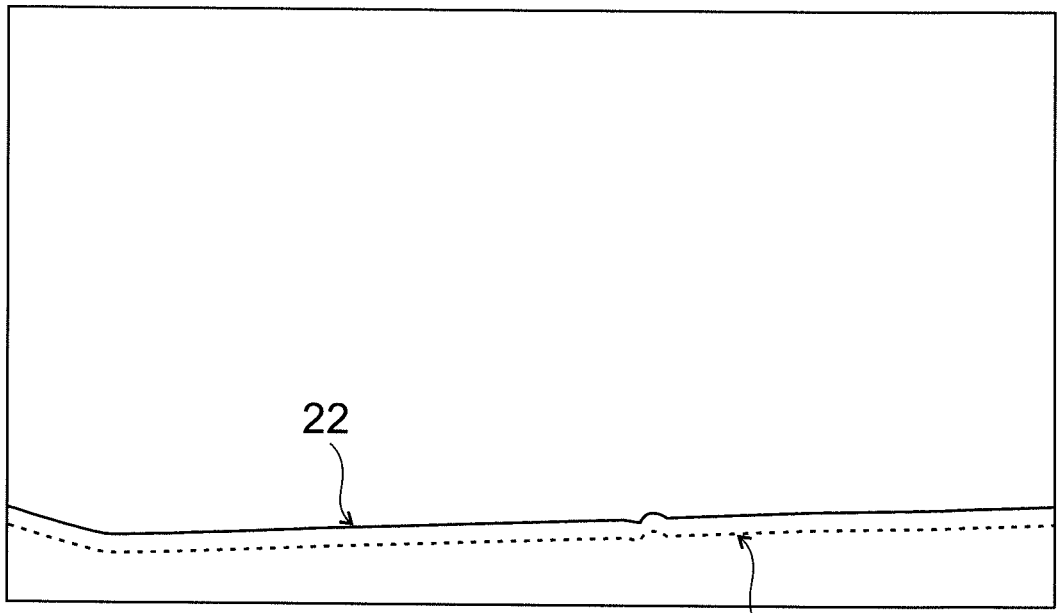
FIG. 5. shows a displaced edge location line.

FIG. 5 shows with a dashed line an example of a displaced edge location line 23 in an input image. In such a case none of the reference locations 21 will constitute an edge location, so a misalignment alert will be generated. In our experiments for car applications, it has been found that a robust misalignment detection can be achieved by alerting misalignment if a gradient threshold limit is not reached in at least 30% of the reference locations 21. Such a limit enables sufficient tolerance for dirt or other disturbances in the detection process, being at the same time sufficiently large to ascertain alignment if no misalignment has occurred.

Figure 6:
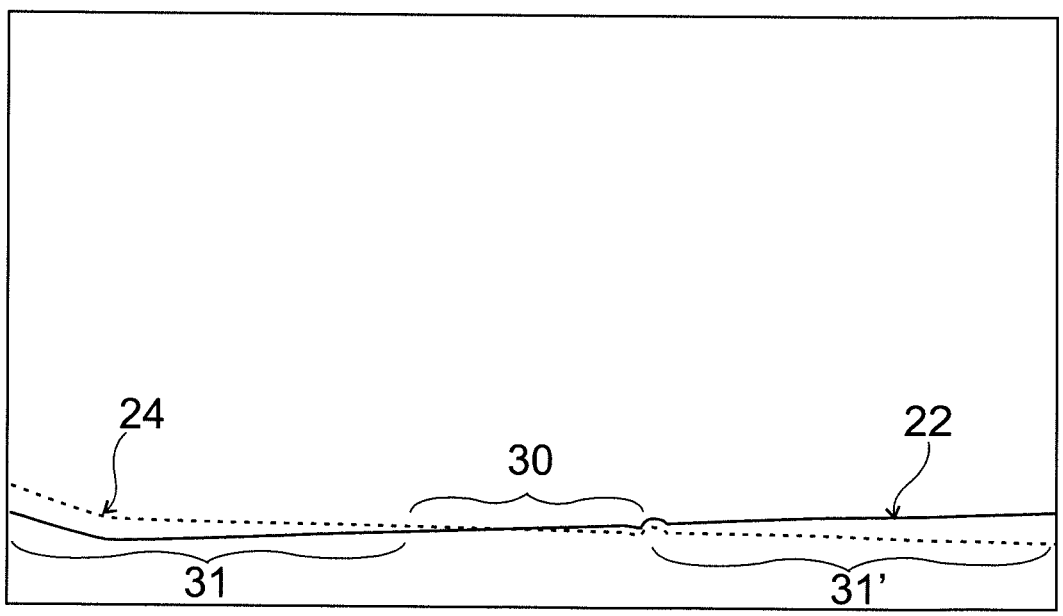
FIG. 6 shows a rotated edge location line.

FIG. 6 shows with a dashed line an example of a rotated edge location line 24 in an input image, i.e. a rotation-type misalignment of the camera. This can be additionally detected and alerted if there is a subset 30 of consecutive neighboring reference locations 21 where the gradient threshold limit is reached for a predetermined fraction of the reference locations 21 in the subset 30, and at least one adjoining subset 31, 31' of consecutive neighboring reference locations 21 where the gradient threshold limit is not reached for a predetermined fraction of the reference locations 21 in the subset 31, 31'. The predetermined fraction can be set e.g. to 80-90% of the total number of respective reference locations 21. If the center of rotation is at the edge of the image, only one adjoining subset 31, 31' may be present for the (or each) aligned subset 30.

It is of preference to provide some tolerance for edge location detection. Accordingly, each reference location 21 can be a pixel of the input image, and reaching the gradient threshold limit can be checked in an n pixel surroundings of the pixel, wherein n is preferably between 0 and 2, and edge location is ascertained if the gradient threshold limit is reached for at least one checked pixel. 0 pixel surroundings means that only the pixel of the reference location 21 is checked, 1 pixel surroundings means that its 8 direct neighboring pixels are also checked, while 2 pixel surroundings means that direct neighboring pixels of the latter are also checked. Of course, any other suitable number can be chosen for n. In this way, small misalignments not affecting correct operation will not be alerted and unnecessary re-calibrations can be avoided.

The magnitude of the image gradient is preferably calculated on the basis of a length of a corresponding image gradient vector. Additionally, the direction of the image gradient vector can also be verified. A preferred way for this to compare the limit with a component of the image gradient vector that is in the expected reference direction. In this way, the magnitude of the image gradient will correspond to a length of a vector component of the image gradient vector, which vector component is parallel with a corresponding reference gradient direction determined in the reference image 10 for the given reference location 21. Preferably, direction is calculated for the pixel having the largest absolute magnitude, i.e. the longest image gradient vector.

The reference image 10 and the input images are preferably grayscale images, but RGB or RGBA images are also conceivable, in which case image gradients can be calculated for each of the image channels, and the largest one of these image gradients can be compared with the gradient threshold limit. In such a way effectiveness of the method can be made independent of colors of the car body and of the surroundings. Of course, other multi-channel processing strategies are also conceivable, e.g. the average of the R, G and B image gradients can also be used for comparison, if appropriate in the light of the given application.

In case of low contrast (e.g. darker) conditions it may be necessary to enhance the contrast of the input image. This can be done by generating each input image by an accumulation of camera images. The number of accumulated camera images (or the timeframe of accumulation) is preferably inversely proportional to the contrast of the camera images. A suitable calculated contrast value is the so called RMS (root mean square) contrast value, which can be used for determining the accumulation timeframe or the number of images to be accumulated. Another way to achieve a sufficient contrast by accumulation is to accumulate camera images until a contrast value characterizing the reference image is reached. Accumulation of images also has a noise-filtering effect.

It is of preference if the width of the boundary 20, i.e. the width of the corresponding transition in the image, is less than the width of a pixel. In this way reference locations 21 can be pixel positions, instead of a group of pixels. To this end, the size of the reference image 10 and of the input images can be smaller than that of the camera image, which size is then selected so as to ensure that the width of the boundary 20 is less than the width of a pixel.

A Gaussian filter can also be applied in the camera images to eliminate noise-like extremes, whereby a more exact gradient calculation can be achieved.

As an additional step, a search for a misaligned edge location can also be carried out for each reference location 21 where the gradient threshold limit is not reached. On the basis of the results of these searches and the revealed closest edge locations the extent and direction of the misalignment can be calculated.

Figure 7:
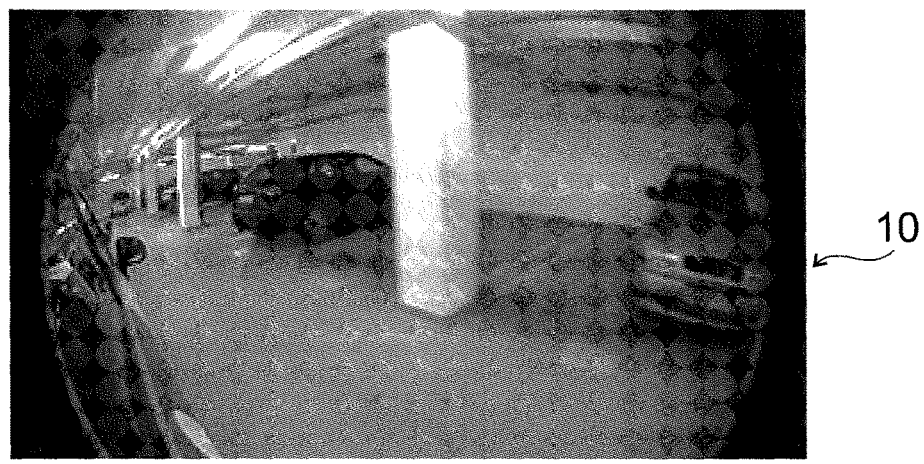
FIG. 7 is a further exemplary reference image.
Figure 8:
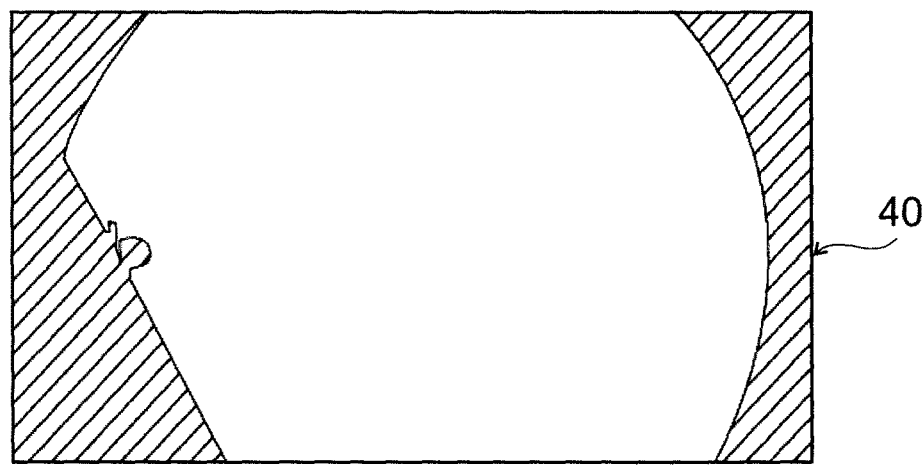
FIG. 8 is a mask image obtained on the basis of the reference image of FIG. 7.

FIG. 7 shows another example of the reference image 10', on the basis of which a mask image 40 as in FIG. 8 can be generated. In the mask image the boundary of the car body and the circular edges due to the fisheye property of the camera are separated from the remaining area.

Figure 9:
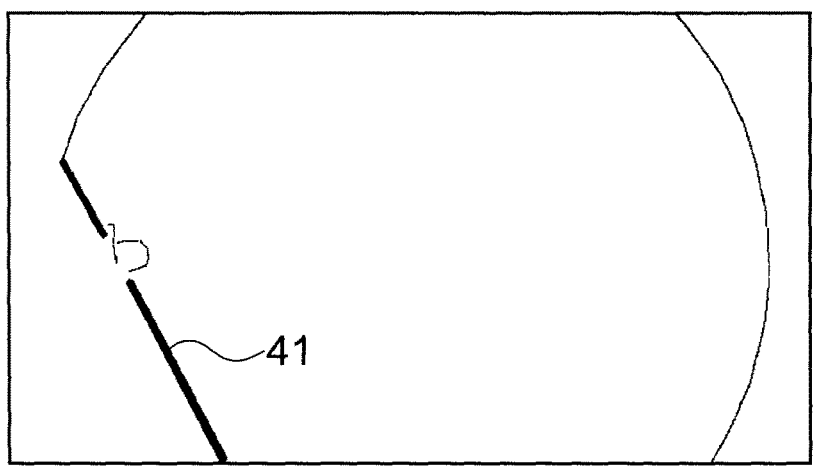
FIG. 9 shows a non-moveable edge identified for reference locations on the basis of the mask image of FIG. 8.

As to the car boundary, the tire or the mirror of the car can move during driving, so those parts are not suitable for reference locations. It is desirable to create a border map for the mask information containing only those edges which stay at the same location all the time during driving. Therefore, the parts of the boundary belonging to the mirror are excluded from defining reference locations 21. The same applies to the circular edges, which will remain the same even if the camera moves—as they belong to and are caused by the camera itself—so they will not indicate any misalignment event. FIG. 9 shows with a thick line the non-moveable edge 41, i.e. the part of the boundary that can be used to define reference locations 21.

In the calibration process the edge sections to be checked can be easily identified manually or by means of any suitable semi-automated or automated method, e.g. by means of neural network image processing. The inventive method is based on an edge set identified as above, more specifically on a set of reference locations 21 on the identified edge set.

If a mask image is also created during the calibration process for the camera, the mask image will identify the pixels belonging to the car and to the background. As the camera is firmly mounted, the mask shall remain the same during driving and can be used for further operations, such as repeated or continuous monitoring, if necessary.

It can be seen that the present approach is not only simpler, compared to prior art ones, but it also requires less computational power. The invention relates to providing a signal when online calibration is required, after which online calibration can be carried out in any suitable way.

The present method does not require the use of additional objects, sensors or data for such alerting. Reference locations are determined during the general calibration process along a boundary of the car body, preferably by taking into account a-priori information as well. The reference locations along the edge of the car body are the only information used in the process.

No special recognition technique is to be used, either. By knowing where the edges of the car body are, it is sufficient to check whether edge-like gradients are present in the input images. There is no need for feature point detection, object classification, etc.; neither are additional sensors required.

The method requires only a small amount of computational power. Thresholding gradients at predetermined locations is a fast and simple method.

The inventive solution overcomes a general technical prejudice that detecting and calibration should form a unified process, and detecting an edge of a car is to be used for calibration at the same time. On the contrary, the inventive method separates calibration and misalignment detection, resulting in a much faster detecting with simple checks that can be carried out in a simple way. This enables misalignment detection well within a second, which can save lives in fast moving vehicles.

The validation process of the invention can also be used for validating a re-calibration by transforming the predetermined reference locations according to the re-calibrating transformation, and carrying out the edge location detection in the transformed reference locations. A cost function can also be created on the basis of edge location detection if searches for misaligned edge locations are also carried out. The cost function may use the misalignment values (distance and direction) calculated on the basis of these search results, and it can be used for autocalibration purposes.

By means of the method a camera system can be operated, which system comprises a camera fixed to a vehicle. Misalignment of the camera can be detected by means of the above method. A computer program product and a computer-readable medium embodying the method are also covered.

While exemplary embodiments have been particularly shown and described, various changes in form and details may be made therein by a person skilled in the art. Such changes and other equivalents are also intended to be encompassed by the following claims.

LIST OF REFERENCE SIGNS 10 reference image
10' reference image
11 vehicle image area
12 remaining area
13 edges
15 middle
16 line section
17 peripheral pixel
20 boundary
21 reference locations
22 reference location line
23 (displaced) edge location line
24 (rotated) edge location line
30 subset
31 subset
31' subset
40 mask image
41 non-moveable edge

The invention claimed is:

1. A method for detecting misalignment of a camera relative to an initial camera alignment, the camera being fixed to a vehicle and having a field of view containing a vehicle image area imaging a portion of the vehicle and a remaining area, the vehicle image area having a boundary with the remaining area, wherein a reference image is taken with the camera in its initial camera alignment and a plurality of reference locations are determined in the reference image as absolute locations, the reference locations being edge locations along the boundary of the vehicle image area in the reference image, and wherein detecting the misalignment is carried out by processing input images taken with the camera after the reference image is taken, the processing comprising:

taking an input image with the camera,
checking specifically at the reference locations within the input image whether the reference locations are edge locations by ascertaining at each reference location whether a magnitude of an image gradient is above a gradient threshold limit, and
alerting camera misalignment depending on an ascertained subset of the reference locations where the gradient threshold limit is not reached,
wherein each reference location is a pixel of the input image, and reaching the gradient threshold limit is checked in an n pixel surroundings of the pixel, wherein n is between 0 and 3, and edge location is ascertained if the gradient threshold limit is reached for at least one checked pixel, and
wherein misalignment is alerted if the gradient threshold limit is not reached in at least 30% of the reference locations.

2. The method according to claim 1, wherein said magnitude of the image gradient is calculated on the basis of a length of a corresponding image gradient vector.

3. The method according to claim 2, wherein said magnitude of the image gradient corresponds to a length of a vector component of the image gradient vector, the vector component being parallel with a corresponding reference gradient direction determined in the reference image for the given reference location.

4. The method according to claim 1, wherein the reference image and the input images are grayscale images.

5. The method according to claim 1, wherein the reference image and the input images are RGB or RGBA images, and in said checking step image gradients are calculated for each channel of the images, and the largest one of these image gradients is compared with the gradient threshold limit.

6. The method according to claim 1, wherein each input image is obtained by an accumulation of camera images, the number of accumulated camera images being inversely proportional to the RMS (root mean square) contrast of a camera image.

7. The method according to claim 1, wherein the size of the reference image and of the input images is smaller than that of the camera image, and said size is selected so as to ensure that a width of said boundary is less than the width of a pixel.

8. The method according to claim 1, wherein said input images are images filtered by applying a Gaussian filter.

9. The method according to claim 1, wherein said gradient threshold limit is selected on the basis of a lowest gradient magnitude among gradient magnitudes at the reference locations in the reference image.

10. The method according to claim 1, wherein a rotation of the camera is alerted if there is a subset of consecutive neighboring reference locations where gradient threshold limit is reached for a predetermined fraction of the reference locations in the subset, and an adjoining subset of consecutive neighboring reference locations where gradient threshold limit is not reached for a predetermined fraction of the reference locations in the subset.

11. The method according to claim 1, wherein a search for a misaligned edge location is carried out for each reference location where the gradient threshold limit is not reached, and calculating misalignment on the basis of the results of the searches.

12. The method according to claim 1, wherein said reference locations in the reference image are determined by finding, along line sections starting from a middle of the reference image outwards, first edge pixels of the vehicle image area.

13. The method according to claim 12, wherein a line section interconnects each peripheral pixel of the reference image with the middle of the reference image, or neighboring line sections are equally angled to each other.

14. The method according to claim 12, wherein a-priori information is used for carrying out said finding only along line sections which may cross said boundary.

15. The method according to claim 1, wherein only a boundary part corresponding to unmovable parts of the vehicle body is used for determining reference locations.

16. A camera system comprising a camera fixed to a vehicle, wherein misalignment of the camera is detected by means of a method according to claim 1.

17. A computer program product comprising:
a non-transitory computer-readable storage medium; and
instructions stored on the non-transitory computer-readable storage medium, which, when executed by a computer, cause the computer to carry out the method of claim 1.

18. A non-transitory computer-readable medium comprising instructions which, when executed by a computer, cause the computer to carry out the method of claim 1.

19. A method for detecting misalignment of a camera relative to an initial camera alignment, the camera being fixed to a vehicle and having a field of view containing a vehicle image area imaging a portion of the vehicle and a remaining area, the vehicle image area having a boundary with the remaining area, wherein a reference image is taken with the camera in its initial camera alignment and a plurality of reference locations are determined in the reference image as absolute locations, the reference locations being edge locations along the boundary of the vehicle image area in the reference image, and wherein detecting the misalignment is carried out by processing input images taken with the camera after the reference image is taken, the processing comprising:
taking an input image with the camera,
checking specifically at the reference locations within the input image whether the reference locations are edge locations by ascertaining at each reference location whether a magnitude of an image gradient is above a gradient threshold limit, and
alerting camera misalignment depending on an ascertained subset of the reference locations where the gradient threshold limit is not reached,
wherein each reference location is a pixel of the input image, and reaching the gradient threshold limit is checked in an n pixel surroundings of the pixel, wherein n is between 1 and 3, and edge location is ascertained if the gradient threshold limit is reached for at least one checked pixel.

* * * * *